(12) United States Patent
Kee et al.

(10) Patent No.: US 8,593,372 B2
(45) Date of Patent: Nov. 26, 2013

(54) FOLDABLE DISPLAY DEVICE

(75) Inventors: In-seo Kee, Seongnam-si (KR); Sang-yoon Lee, Seoul (KR); Hong-shik Shim, Seoul (KY)

(73) Assignees: Samsung Electronics Co., Ltd. (KR); Samsung Display Co., Ltd. (KR)

( * ) Notice: Subject to any disclaimer, the term of this patent is extended or adjusted under 35 U.S.C. 154(b) by 29 days.

(21) Appl. No.: 13/360,991

(22) Filed: Jan. 30, 2012

(65) Prior Publication Data

US 2012/0192466 A1     Aug. 2, 2012

(30) Foreign Application Priority Data

Feb. 1, 2011   (KR) .................. 10-2011-0010208

(51) Int. Cl.
 *G09G 5/00*     (2006.01)
(52) U.S. Cl.
 USPC ............................................ 345/1.3; 40/541
(58) Field of Classification Search
 USPC ............. 40/1, 735, 541; 345/1.3; 361/679.28, 361/679.04; 362/278, 320, 449
 See application file for complete search history.

(56) References Cited

U.S. PATENT DOCUMENTS

| | | | | |
|---|---|---|---|---|
| 7,876,286 | B2 * | 1/2011 | Kee et al. | 345/1.3 |
| 8,213,167 | B2 * | 7/2012 | Kim | 361/679.26 |
| 2008/0203907 | A1 * | 8/2008 | Lee et al. | 313/504 |
| 2010/0201603 | A1 * | 8/2010 | Kee et al. | 345/1.3 |
| 2010/0201604 | A1 * | 8/2010 | Kee et al. | 345/1.3 |

FOREIGN PATENT DOCUMENTS

| | | |
|---|---|---|
| JP | 2009162999 A | 7/2009 |
| KR | 1020000075223 A | 12/2000 |
| KR | 1020090092220 A | 8/2009 |

* cited by examiner

*Primary Examiner* — Joanne Silbermann
*Assistant Examiner* — Kristina Junge
(74) *Attorney, Agent, or Firm* — Cantor Colburn LLP

(57) ABSTRACT

A foldable display device includes a first display panel which displays a portion of an image; a second display panel which displays a second portion different from the first portion of the image; a first protecting window on the first display panel; a second protecting window on the second display panel; and a flexible material layer between the first and second protecting windows. Side surfaces of the first and second protecting windows which contact the flexible material layer, respectively, are inclined with respect to a surface of each of the first and second protecting windows.

16 Claims, 3 Drawing Sheets

FOLDABLE DISPLAY DEVICE

CROSS-REFERENCE TO RELATED APPLICATIONS

This application claims the benefit of Korean Patent Application No. 10-2011-0010208, filed on Feb. 1, 2011, in the Korean Intellectual Property Office, the disclosure of which is incorporated herein in its entirety by reference.

BACKGROUND

1. Field

Provided is a foldable display device, and more particularly, a foldable display device including an organic light-emitting device.

2. Description of the Related Art

Foldable display devices may be portable and realize a large-sized image. Foldable display devices are applied not only to mobile devices such as mobile phones, portable multimedia players ("PMPs"), navigation systems, ultra mobile PCs ("UMPCs"), electronic books, electronic newspapers, etc. but also to televisions ("TVs") and monitors.

A foldable display device includes a protecting window for protecting a screen from an external impact. The protecting window is generally formed of a hard material, and a folded portion of the foldable display device is formed of a flexible material that is softer than the material for forming the protecting window. However, total reflection of light directed to the flexible material from the protecting window may occur at a boundary surface between the protecting window and the flexible material due to a difference between refractive indexes of the protecting window and the flexible material, thereby resulting in a phenomenon in which an image displayed on both protecting windows around a folded portion of the foldable display device seems to be cut off.

SUMMARY

Provided is a foldable display device including an organic light-emitting device.

Additional aspects will be set forth in part in the description which follows and, in part, will be apparent from the description, or may be learned by practice of the presented embodiments.

Provided is a foldable display device which includes a first display panel which displays a first portion of an image; a second display panel which displays a second portion different from the first portion of the image; a first protecting window which overlaps the first display panel; a second protecting window which overlaps the second display panel; and a flexible material layer between the first and second protecting windows. First and second side surfaces of the first and second protecting windows which face each other and respectively contact the flexible material layer are inclined with respect to an upper or a lower surface of each of the first and second protecting windows.

An interval between the first and second side inclined surfaces may increase in a direction from the display panels to the protecting windows.

The first and second protecting windows may include a transparent material which is harder than a material of the flexible material layer.

The first and second protecting windows may include glass, and the flexible material layer may include a silicon resin.

A portion of the second display panel may overlap with the first display panel.

Upper surfaces of the first and second protecting windows, and an upper surface of the flexible material layer may be coplanar.

The flexible material layer may be further between the first display panel and the first protecting window.

The first display panel may include a first substrate, and a first display panel on the first substrate. The second display panel may include a second substrate, and a second display device on the second substrate.

The first and second display devices each may include an organic light-emitting device ("OLED").

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
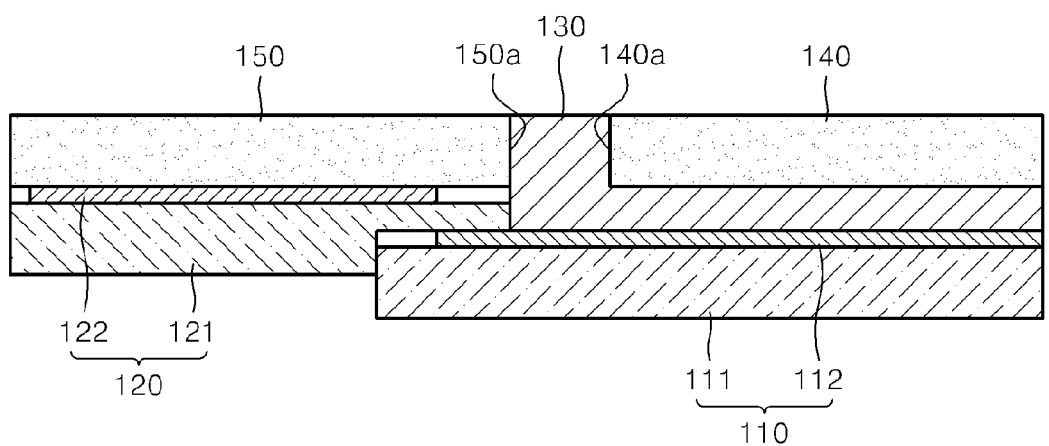
FIG. 1 is a cross-sectional view illustrating an example of a related foldable display device.

Hereinafter, the present invention will be described in detail by explaining embodiments of the invention with reference to the attached drawings. The same reference numerals in the drawings denote the same element. In the drawings, the thicknesses of layers and regions are exaggerated for clarity.

It will be understood that when an element or layer is referred to as being "on" or "connected to" another element or layer, the element or layer can be directly on or coupled to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional view illustrating an example of a related foldable display device.

Referring to FIG. 1, a first display panel 110 and a second display panel 120 partially overlap with each other. In detail, the second display panel 120 is on the first display panel 11 and overlaps with a portion of the first display panel 110. In this regard, the first display panel 110 includes a first substrate 111, and a first display device 112 on the first substrate 111. The second display panel 120 includes a second substrate 121, and a second display device 122 on the second substrate 121. The first and second display devices 112 and 122 display first and second images, respectively, and may include, for example, an organic light-emitting device ("OLED").

A first protecting window 140 overlaps a portion of the first display panel 110, and a second protecting window 150 overlaps an entire of the second display panel 120. The first and second protecting windows 140 and 150 respectively protect the first and second display panels 110 and 120 from an outside of the display device and may include a transparent hard material, for example, glass. The first protecting window 140 may cover only a portion of the first display device 112, and the second protecting window 150 may cover an entire of the second display device 122.

A flexible material layer 130 including a material that is softer than the materials of the first and second protecting windows 140 and 150 completely fills a distance between the first protecting window 140 and the second protecting window 150. The flexible material layer 130 may include, for example, a transparent silicon resin. The flexible material layer 130 may cover a portion of the first display device 112. When the foldable display device is in an unfolded state, upper surfaces of the first and second protecting windows 140 and 150 and an upper surface of the flexible material layer 130 may form a plane at a same height. In this regard, the flexible material layer 130 may be filled between the first protecting window 140 and the first display panel 110. Side surfaces 140a and 150a of the first and second protecting windows 140 and 150 contacting the flexible material layer 130 are perpendicular to the upper surfaces and/or lower surfaces of the first and second protecting windows 140 and 150.

Figure 2:
FIG. 2 is an enlarged view of side surfaces of first and second protecting windows contacting a flexible material layer of FIG. 1.
Figure 2:
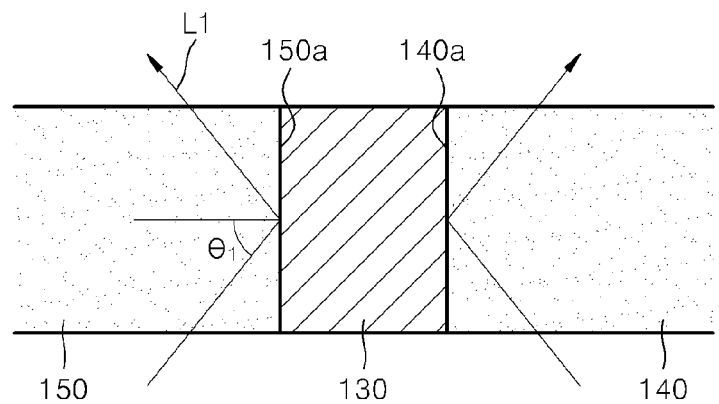

FIG. 2 is an enlarged view of the side surfaces 140a and 150a of the first and second protecting windows 140 and 150 contacting the flexible material layer 130 of FIG. 1. As illustrated in FIG. 2, in the foldable display device having a structure in which the side surfaces 140a and 150a of the first and second protecting windows 140 and 150 contacting the flexible material layer 130 are perpendicular to the upper and lower surfaces of the first and second protecting windows 140 and 150, a possibility that total reflection may occur at boundary surfaces between the flexible material layer 130 and the first and second protecting windows 140 and 150 is high.

Materials of the first and second protecting windows 140 and, and a material of the flexible material layer 130 have different refractive indexes. In one embodiment, for example, the first and second protecting windows 140 and 150 may include glass having a refractive index of 1.51, and the flexible material layer 130 may include a silicon resin having a refractive index of 1.41. As such, when the first and second protecting windows 140 and 150 and the flexible material layer 130 have different refractive indexes, if light L1 emitted from the first and second display devices 112 and 122 is incident toward the side surfaces 140a and 150a of the first and second protecting windows 140 and 150 contacting the flexible material layer 130, the possibility that total reflection may occur at the side surfaces 140a and 150a of the first and second protecting windows 140 and 150 is increased. That is, if the light L1 emitted from the first and second display devices 112 and 122 is incident at an incident angle $\theta_1$ that is greater than a predetermined critical angle, the light L1 may not pass through the side surfaces 140a and 150a of the first and second protecting windows 140 and 150, and thus the light L1 is total-reflected. Since the total-reflected light L1 may not reach an observer 30, the observer 30 may conclude that a screen of the foldable display device is cut off at the boundary surfaces between the flexible material layer 130, and the first and second protecting windows 140 and 150, that is, at the side surfaces 140a and 150a of the first and second protecting windows 140 and 150, respectively.

Figure 3:
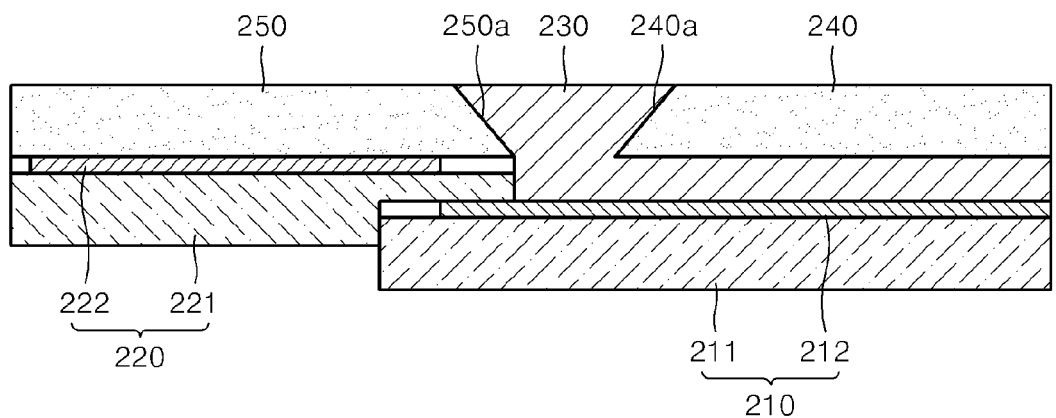
FIG. 3 is a cross-sectional view illustrating a foldable display device, according to an embodiment of the present invention.
Figure 4:
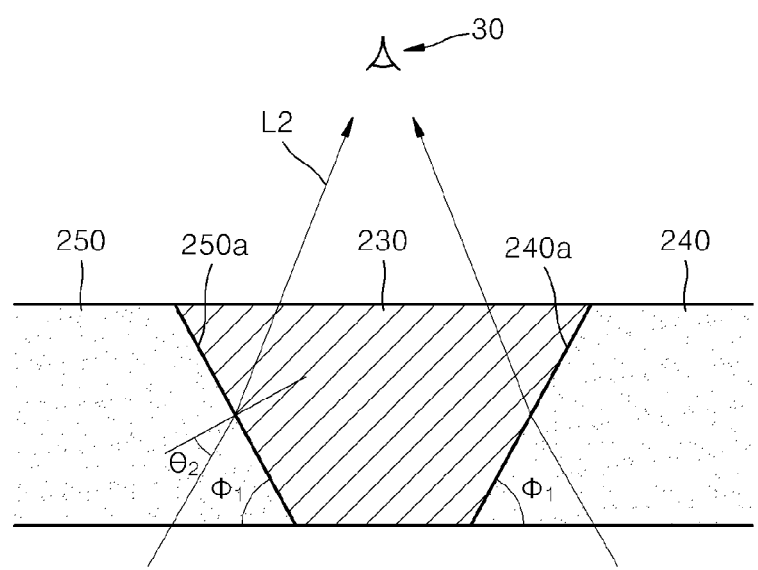
FIG. 4 is an enlarged view of side surfaces of first and second protecting windows contacting a flexible material layer of FIG. 3.

FIG. 3 is a cross-sectional view illustrating a foldable display device, according to an embodiment of the present invention. The foldable display device according to the illustrated embodiment may be manufactured in such a way that a plurality of display panels are connected to one another by using any of various methods to form a single screen. However, for convenience of description, FIG. 3 illustrates the foldable display device in which two display panels are connected to each other to form a single screen. FIG. 4 is an enlarged view of inclined side surfaces of first and second protecting windows 240 and 250 contacting a flexible material layer 230 of FIG. 3.

Referring to FIGS. 3 and 4, the foldable display device of the illustrated embodiment includes first and second display panels 210 and 220. The first display panel 210 may display a portion of an image, and the second display panel 220 may display a remaining portion of the image. In this regard, the first and second display panels 210 and 220 may partially overlap with each other. In detail, the second display panel 220 may be on the first display panel 210 and overlap with a portion of the first display panel 210.

The first display panel 210 includes a first substrate 211, and a first display device 212 on the first substrate 211. The second display panel 220 includes a second display panel 220, and a second display device 222 on the second substrate 221. The first and second substrates 211 and 221 may include, for example, glass or plastic, and may also include any of various materials. The first and second display devices 212 and 222 display first and second images, respectively. In this regard, the first and second display devices 212 and 222 may be disposed in such a way that the first and second images form a single screen that is horizontally connected when the foldable display device is in an unfolded state. For this, as illustrated in FIG. 3, a left end portion of the first display device 212 and a right end portion of the second display device 222 may be on the same vertical line, that is, aligned with each other.

The first and second display devices 212 and 222 each may include an OLED. In this case, a thin film transistor ("TFT") for driving the OLED may further be on each of the first and second substrates 211 and 221. The first and second display devices 212 and 222 each may also include a liquid display device, a field emission device, or a plasma display device.

The first and second protecting windows 240 and 250 may be on the first and second display panels 210 and 220, respectively. The first protecting window 240 covers the first display panel 210 to protect the first display panel 210 from the outside. The first protecting window 240 may cover only a portion of the first display device 212. The second protecting window 250 covers the second display panel 220 to protect the second display panel 220 from the outside. The second protecting window 250 may cover the entire second display device 222. The first and second protecting windows 240 and 250 may include a transparent material that is harder than the flexible material layer 230 to be described later. In one embodiment, for example, the first and second protecting windows 240 and 250 may include glass having a refractive index of 1.51. However, the present invention is not limited thereto, and the first and second protecting windows 240 and 250 may include various materials, for example, transparent plastic such as acrylic or polycarbonate.

The first and second protecting windows 240 and 250 may be spaced apart from each other, and the flexible material layer 230 is between the first and second protecting windows 240 and 250. Thus, when the foldable display device of the illustrated embodiment is in a folded state, the flexible material layer 230 between the first and second protecting windows 240 and 250 is in a folded state. In this regard, the flexible material layer 230 may include a transparent flexible material that is softer than the materials of the first and second protecting windows 240 and 250. In one embodiment, for example, the flexible material layer 230 may include a silicon resin having a refractive index of 1.41. However, the present invention is not limited thereto, and the flexible material layer 230 may include any of various materials, for example, polytetrafluoroethylene ("PTFE"), polymethylmethacrylate ("PMMA"), or polydimethylsiloxane ("PDMS"). When the foldable display device of the illustrated embodiment is in an unfolded state, upper surfaces of the first and second protecting windows 240 and 250 and an upper surface the flexible material layer 230 may collectively form a plane having at a same height. The flexible material layer 230 may be further between the first protecting window 240 and the first display panel 210. In this case, the portion of the flexible material later 230 between the first and second protecting windows 240 and 250, and the portion of the flexible material layer 230 between the first protecting window 240 and the first display panel 210 collectively form a single, unitary, indivisible member.

In the illustrated embodiment, side surfaces of the first and second protecting windows 240 and 250 contacting the flexible material layer 230 are inclined with respect to the upper and/or lower surfaces of the first and second protecting windows 240 and 250. In detail, the side surfaces of the first and second protecting windows 240 and 250 contacting the flexible material layer 230 may respectively include first and second inclined surfaces 240a and 250a which are inclined at a predetermined inclined angle $\phi_1$ with respect to the upper surfaces or lower surfaces of the first and second protecting windows 240 and 250 as illustrated in FIGS. 3 and 4. An interval between the first and second inclined surfaces 240a and 250a increases in a direction from the lower surfaces to the upper surfaces of the first and second protecting windows 240 and 250. The inclined angles $\phi_1$ of the first and second inclined surfaces 240a and 250a may vary according to design conditions such as the refractive indexes of the first and second protecting windows 240 and 250 and the flexible material layer 230.

As described in the illustrated embodiment, in the foldable display device having a structure in which the side surfaces of the first and second protecting windows 240 and 250 contacting the flexible material layer 230 are inclined, the possibility that total reflection occurs at boundary surfaces between the flexible material layer 230 and the first and second protecting windows 240 and 250, that is, at the first and second inclined surfaces 240a and 250a is decreased, compared to the foldable display device in which the side surfaces 140a and 150a of the first and second protecting windows 140 and 150 are perpendicular to the upper and lower surfaces of the first and second protecting windows 140 and 150 as illustrated in FIGS. 1 and 2.

In detail, as illustrated in FIG. 4, light L2 emitted from the first and second display devices 212 and 222 is incident at a predetermined incident angle $\theta_2$ on first and second inclined surfaces of the first and second inclined surface contacting the flexible material layer 230. At this time, since an interval between the first and second inclined surfaces 240a and 250a is increased in a direction towards the upper surfaces of the first and second protecting windows 240a and 250, the incident angle $\theta_2$ incident on the first and second inclined surfaces 240a and 250a is smaller than the incident angle $\theta_1$ illustrated in FIG. 2. Accordingly, if the inclined angles $\phi_1$ of the first and second inclined surfaces 240a and 250a are adjusted, light L2 emitted from the first and second display devices 212 and 222 passes through the first and second inclined surfaces 240a and 250a without being mostly total-reflected and reaches the observer 30. Thus, the observer 30 may observe that a screen is not cut off at the boundary surfaces between the flexible material layer 230 and the first and second protecting windows 240 and 250, that is, at the first and second inclined surfaces 240a and 250a.

Figure 5:
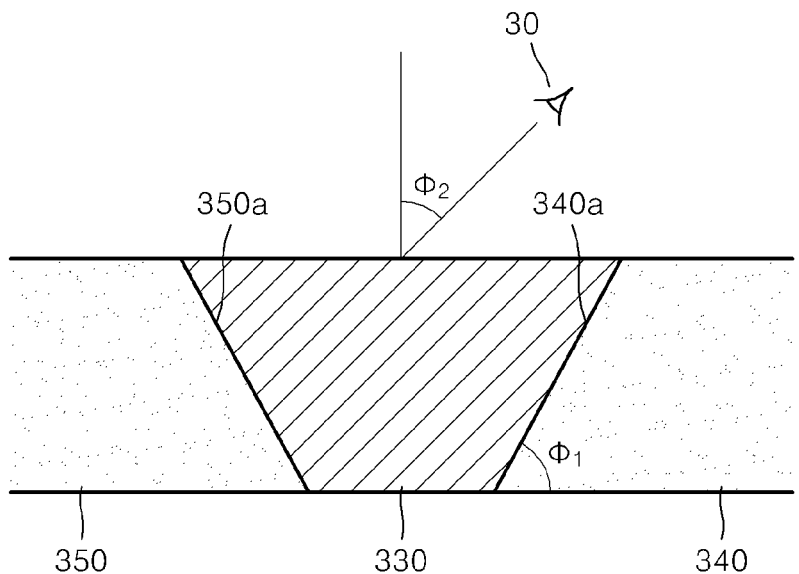
FIG. 5 is a diagram illustrating inclined angles of side surfaces of first and second protecting windows contacting a flexible material layer and an observer's viewing angle.
Figure 6:
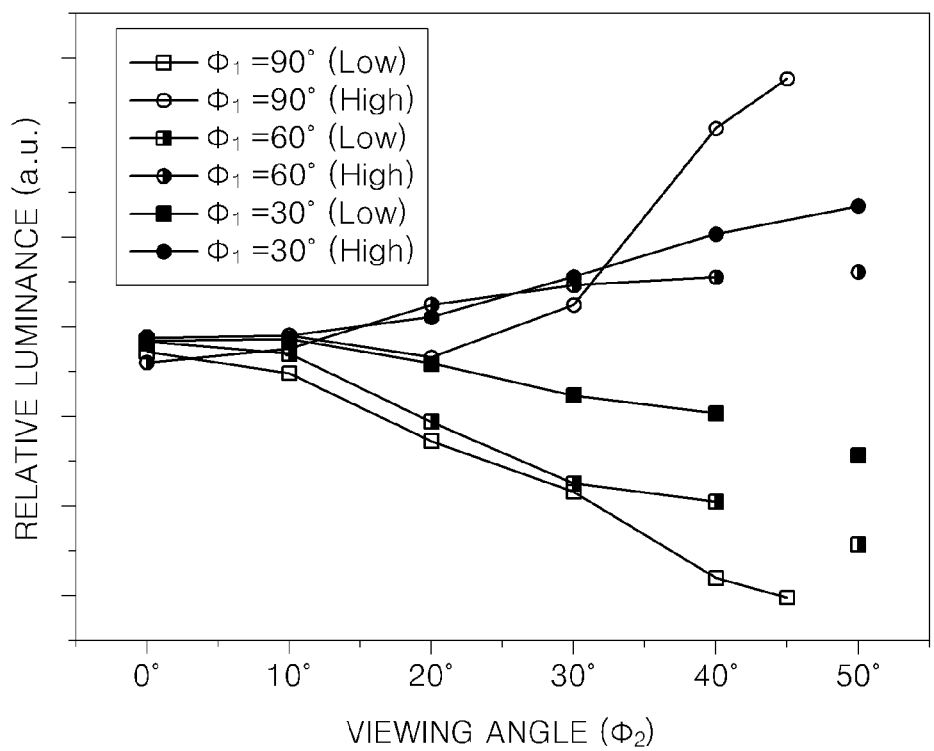
FIG. 6 is a graph showing relative luminances observed from the side surfaces of the first and second protecting windows according to an observer's viewing angle when inclined angles of the side surfaces of the first and second protecting windows are 90°, 60°, and 30°.

FIGS. 5 and 6 illustrate a result obtained by measuring relative luminances at first and second side surfaces 340a and 350a of first and second protecting windows 340 and 350 contacting a flexible material layer 330 according to an observer's viewing angle. In detail, FIG. 5 is a diagram illustrating inclined angles $\phi_1$ of the first and second side surfaces 340a and 350a of the first and second protecting windows 340 and 350 contacting the flexible material layer 330, and the observer's viewing angle $\phi_2$. In FIG. 5, the inclined angle $\phi_1$ is an angle of the first and second side surfaces 340a and 350a of the first and second protecting windows 340 and 350 with respect to upper surfaces and lower surfaces of the first and second protecting windows 340 and 350. The viewing angle $\phi_2$ is an angle between the foldable display device and the observer 30 with respect to a center (e.g., normal) line between the first and second protecting windows 340 and 350.

FIG. 6 is a graph showing relative luminance observed from the first and second side surfaces 340a and 350a of the first and second protecting windows 340 and 350 according to the observer's viewing angle $\phi_2$ when inclined angles $\phi_1$ of the first and second side surfaces 340a and 350a of the first and second protecting windows 340 and 350 are 90°, 60°, and 30°. In FIG. 6, $\phi_1$=90° (Low) and $\phi_1$=90° (High) respectively show a low luminance and a high luminance that are respectively measured at the first and second side surfaces 340a and 350a when the inclined angles $\phi_1$ of the first and second side surfaces 340a and 350a are 90° as illustrated in the foldable display device of FIGS. 1 and 2. Also, $\phi_1$=60° (Low) and $\phi_1$=60° (High) respectively show a low luminance and a high luminance that are respectively measured at the first and second inclined surfaces 240a and 250a when the inclined angles $\phi_1$ of the first and second inclined surfaces 240a and 250a are 60°. In addition, $\phi_1$=30° (Low) and $\phi_1$=30° (High) respectively show a low luminance and a high luminance that are respectively measured at the first and second side surfaces 340a and 350a when the inclined angles $\phi_1$ of the first and second side surfaces 340a and 350a are 30°.

Referring to FIG. 6, as described in the embodiment regarding the foldable display device of FIGS. 1 and 2, when the inclined angles $\phi_1$ of the first and second side surfaces 340a and 350a of the first and second protecting windows 340 and 350 are 90°, as the viewing angle $\phi_2$ is increased, a difference between luminances measured at the first and second side surfaces 340a and 350a is increased. As a result, as the viewing angle $\phi_2$ is increased, the observer 30 may feel more like a screen is cut off at the first and second side surfaces 340a and 350a. In contrast, as described in the illustrated embodiments of the present invention, when the first and second side surfaces 340a and 350a of the first and second protecting windows 340 and 350 are inclined at a predetermined angle instead of 90°, the difference between luminances measured at the first and second side surfaces 340a and 350a is smaller than that between the luminances measured at the first and second side surfaces 340a and 350a when the inclined angles $\phi_1$ of the first and second side surfaces 340a and 350a of the first and second protecting windows 340 and 350 are 90°. Thus, when the first and second side surfaces 340a and 350a of the first and second protecting windows 340 and 350 contacting the flexible material layer 330 are inclined, the observer 30 may feel less like a screen is cut off at the boundary surfaces between the flexible material layer 330 and the first and second protecting windows 340 and 350.

As described above, according to the embodiments of the present invention, a phenomenon in which light emitted from a display device is total-reflected at a side surface of a protecting window may be reduced by the side surface of the protecting window contacting a flexible material layer being inclined. Thus, an observer may feel less like a screen is cut off at the side surface of the protecting window.

It should be understood that the embodiments described therein should be considered in a descriptive sense only and not for purposes of limitation. Descriptions of features or aspects within each embodiment should typically be considered as available for other similar features or aspects in other embodiments.

What is claimed is:

1. A foldable display device comprising:
   a first display panel which displays a first portion of an image;
   a second display panel which displays a second portion different from the first portion of the image;
   a first protecting window which overlaps the first display panel, and includes a first side surface;
   a second protecting window which overlaps the second display panel, and includes a second side surface which faces the first side surface of the first protecting window; and
   a flexible material layer between the first and second protecting windows,
   wherein the first and second side surfaces of the first and second protecting windows contact the flexible material layer, respectively, and are inclined with respect to an upper or a lower surface of each of the first and second protecting windows.

2. The foldable display device of claim 1, wherein an interval between the first and second inclined side surfaces increases in a direction from the display panels to the protecting windows.

3. The foldable display device of claim 1, wherein the first and second protecting windows comprise a transparent material which is harder than a material of the flexible material layer.

4. The foldable display device of claim 3, wherein
   the first and second protecting windows comprise glass, and
   the flexible material layer comprises a silicon resin.

5. The foldable display device of claim 1, wherein a portion of the second display panel overlaps with the first display panel.

6. The foldable display device of claim 5, wherein the upper surfaces of the first and second protecting windows and an upper surface of the flexible material layer are coplanar.

7. The foldable display device of claim 6, wherein flexible material layer is further between the first display panel and the first protecting window.

8. The foldable display device of claim 1, wherein
   the first display panel comprises a first substrate, and a first display panel on the first substrate, and
   the second display panel comprises a second substrate, and a second display device on the second substrate.

9. The foldable display device of claim 8, wherein the first and second display devices each comprise an organic light-emitting device.

10. The foldable display device of claim 1, wherein the flexible material layer is at a folding portion of the foldable display device.

11. A foldable display device comprising:
    a first display panel which displays a first portion of an image;
    a second display panel which displays a second portion different from the first portion of the image; and
    further comprising a protecting layer on viewing side of the first and second display panels, wherein the protecting layer comprises:

a first transparent portion which overlaps the first and second display panels, and includes a first material; and a second transparent portion which is at a folding portion of the foldable display device, and includes a second material which is softer than the first material of the first transparent portion;

wherein a boundary between the first and second transparent portions is inclined in a cross-sectional view of the foldable display device.

12. The foldable display device of claim 11, wherein
the first transparent portion includes a first portion which overlaps the first display panel, and a second portion which overlaps the second display panel, and the second transparent portion is between the first and second portions of the first transparent portion, wherein a first boundary between the first portion of the first transparent portion and the second transparent portion is inclined in the cross-sectional view of the foldable display device, a second boundary between the second portion of the first transparent portion and the second transparent portion is inclined in the cross-sectional view of the foldable display device, and the first and second boundaries face each other.

13. The foldable display device of claim 12, wherein
the second transparent portion is further between the second portion of the first transparent portion and the second display panel.

14. The foldable display device of claim 13, wherein the second transparent portion is a single, unitary, indivisible member.

15. The foldable display device of claim 12, wherein upper surfaces of the first and second portions of the first transparent portion, and an upper surface of the second transparent portion are coplanar.

16. A method of forming a foldable display device, the method comprising:

forming a first transparent layer and a second transparent layer on a viewing side of a first display panel and a second display panel, respectively, and forming a flexible third transparent layer between the first and second transparent layers, and in a folding portion of the foldable display device, wherein side surfaces of the third transparent layer respectively contact the first and second transparent layers; and the side surfaces are inclined in a cross-sectional view of the foldable display device.

* * * * *